Dec. 15, 1942. K. M. YOST 2,304,870
ELECTRIC COUPLING
Filed Jan. 2, 1941
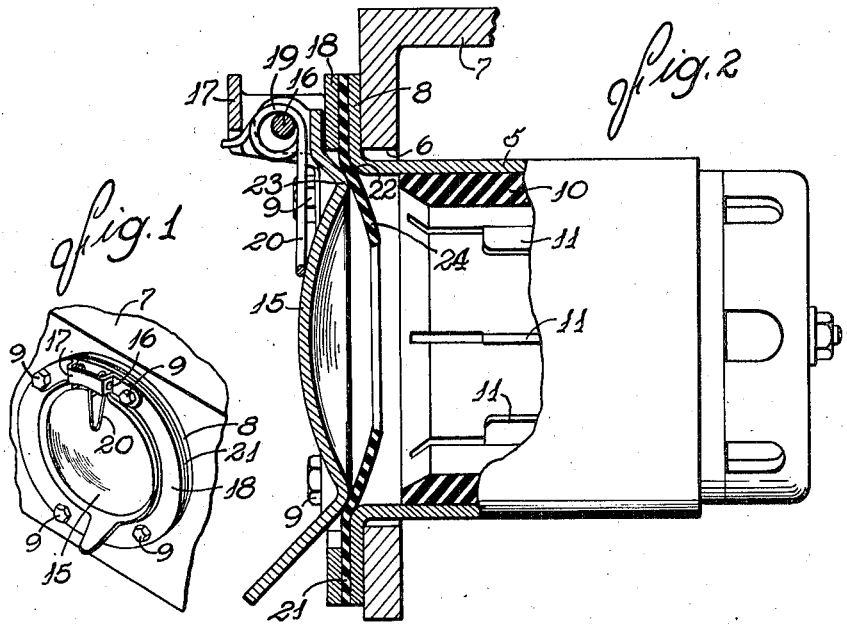
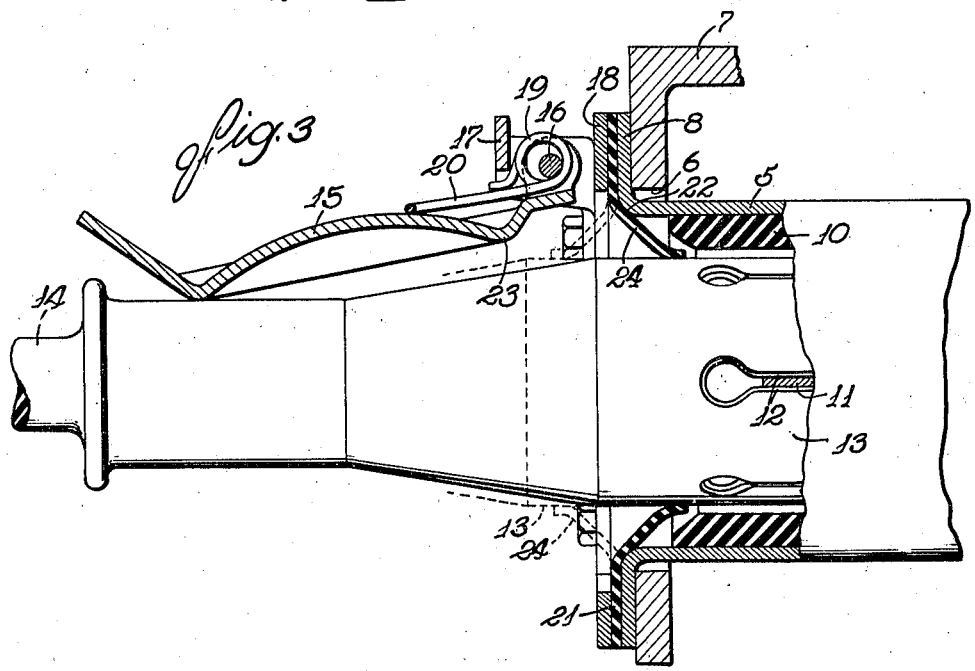
INVENTOR
Karl M. Yost
By Parker, Carlson, Pitzner & Hubbard
ATTORNEYS Patented Dec. 15, 1942

2,304,870

UNITED STATES PATENT OFFICE 2,304,870

ELECTRIC COUPLING

Karl M. Yost, Beloit, Wis., assignor to Warner Electric Brake Manufacturing Company, South Beloit, Ill., a corporation of Illinois Application January 2, 1941, Serial No. 372,789

6 Claims. (Cl. 173—332)

This invention relates to improvements in electric couplings having sockets for receiving the ends of electric cables.

The general object is to provide novel means operating to prevent dust or other foreign matter from entering the open end of the socket either when the conductor is inserted in the socket or withdrawn therefrom.

The invention also resides in the simple and inexpensive construction of the excluding means above referred to.

Other objects and advantages of the invention will become apparent from the following detailed description taken in connection with the accompanying drawing, in which Figure 1 is a perspective view of the improved socket when closed.

Fig. 2 is a side elevational view partially broken away to show the socket in section.

Fig. 3 is a similar view with an electric conductor inserted in the socket.

The socket shown in the drawing by way of illustration includes a generally cylindrical metal shell 5 inserted through opening 6 in a suitable support 7 and having a flange 8 at its open end clamped against the support by cap screws 9 projecting through the flange and threading into the support. Nesting snugly within the shell is a cup-shaped insulator 10 carrying contact blades 11 which enter between hairpin type contacts 12 molded in the enlarged head 13 of the electric cable 14. The head 13 is received in the insulator cup with some clearance and is held therein by reason of the frictional gripping engagement between contacts 12 and the blades 11, the relation being as shown in Fig. 3 when the cable head is fully inserted.

The open end of the socket is closed by a cover 15 which closes automatically as the cable head is withdrawn from the socket. Herein, the cover is hinged on a pin 16 supported by a bracket 17 which in turn is fastened to a flat ring 18 clamped in place by the screws 9. A spring 19 mounted on the pivot pin has an arm 20 bearing against the cover and urging the latter toward closed position as shown in Figs. 1 and 2. While the cable head is inserted in the socket, the cover bears against the cable as shown in Fig. 3.

A gasket 21 is provided to form an effective seal which excludes any possibility of water or foreign matter entering the socket with the cover closed. The gasket comprises a ring of flexible material such as rubber clamped between the ring 18 and the flange 8 with its inner peripheral edge projecting inwardly beyond the rounded surface 22 between the shell 5 and the flange 8. The cover 15 is dished to make it rigid and also to provide an annular rib 23 of a diameter slightly smaller than the internal wall 5 and acting when the cover is closed to press the gasket ring against the rounded corner 22.

In accordance with the present invention, the gasket ring is utilized to perform the additional function of providing a seal around the cable head 13 when inserted in the socket thereby preventing dust and foreign matter from entering the socket and coming onto the contacts. For this purpose, the central opening in the gasket ring conforms to the external shape of the cable head 13 and is made somewhat smaller than the latter. The inner peripheral edge portion 24 of the ring constitutes a yieldable flange which is expansible and free to flex inwardly and outwardly relative to the open end of the socket.

As an incident to insertion of the cable head 13 after opening of the cover, the flexible flange 24 is bent and its opening expanded to permit full entry of the cable head as shown in Fig. 3. In this stretched condition, the gasket ring grips the cable head around a portion disposed between the contacts 12 and the open end of the socket thus forming an effective seal around the head excluding foreign matter from the interior of the socket or any portion of the interengaging contacts. During the withdrawal of the cable head from the socket, the flange 24 is flexed reversely to the position shown in dotted outline in Fig. 3 after which the cable head slides out of the ring, the latter contracting and assuming the position shown in Fig. 2 as the cover closes automatically.

It will be apparent that the ring 21 although of simple and inexpensive construction, provides a gasket coacting with the cover to form an effective closure when the socket is not in use and also functions to provide a seal around the conductor end when the latter is inserted in the socket.

I claim as my invention:

1. An electric coupling of the character described having, in combination, a socket comprising a cup-shaped shell having contacts on the interior thereof, a cable including a head insertable in said socket and having contacts interengageable with the socket contacts, a cover hinged on said shell and having a peripheral rib engageable with the open end of the shell in closed position, and a ring of yieldable material carried by said shell and partially closing said open end, said ring coacting with said cover to seal the shell closed and having a central opening smaller than said head and expansible automatically as an incident to insertion of the head in said socket whereby to close the socket around the head and thereby exclude foreign matter from said contacts.

2. An electric coupling of the character described having, in combination, a socket comprising a cup-shaped shell having contacts on the interior thereof, a cable including a head insertable in said socket and having contacts interengageable with the socket contacts, a ring of yieldable material carried by said shell and partially closing said open end, said ring having a central opening smaller than said head and expansible automatically as an incident to insertion of the head in said socket whereby to close the socket around the head and thereby exclude foreign matter from said contacts, and a cover hinged on said socket and having a surface movable into and out of engagement with said ring by swinging of the cover toward and away from the open end of said socket.

3. A socket of the character described having, in combination, an open ended socket for receiving the end of a conductor and having contact terminals therein, a flexible flange extending around and projecting inwardly from the socket wall between said terminals and the open end, a cover for the socket bearing against said flange to seal the socket closed, said cover being movable to open the socket and permit insertion of a conductor through said flange, and means fixed on said socket and separate from said cover for fastening the flange and socket together.

4. A socket of the character described having, in combination, an open ended socket for receiving the end of a conductor and having contact terminals therein, an out-turned flange at the open end of said socket, a generally flat ring of rubber or the like clamped against said flange with its inner peripheral edge partially closing said open end whereby to flex inwardly and outwardly during insertion of a conductor in said socket and removed therefrom, and a cover for closing said open end hinged on said flange and having a surface swingable with the cover and bearing, when in closed position, against said ring at the inner edge of said flange.

5. An electric coupling of the character described having, in combination, a socket comprising a cup-shaped shell having contacts on the interior thereof, a cable including a head insertable in said socket and having contacts interengageable with the socket contacts, a flexible flange of resilient material carried by said shell at the open end thereof and projecting inwardly from the socket wall, said flange defining an opening smaller than the diameter of said head whereby the flange is flexed axially as an incident to insertion of the head in said socket and engages the periphery of said head to form a seal between said shell and the head, and a cover for said socket hinged on said shell and adapted for axial engagement with the outer surface of said flange when the cover is closed against the end of said shell.

6. An electric coupling of the character described having, in combination, a socket comprising a cup-shaped shell having contacts on the interior thereof, a cable including a head insertable in said socket and having contacts interengageable with the socket contacts, a flexible flange carried by said shell at the open end thereof and projecting inwardly from the socket wall with its outer portion backed by the shell, said flange being flexed axially as an incident to insertion of the head in said socket whereby to form a seal around the periphery of the head, and a cover for said socket hinged on said shell and adapted, when the cover is closed against the end of said shell, for axial engagement with said outer portion around the inner edge of the area which is backed by said shell.

KARL M. YOST.